J. B. ENTZ.
MOTOR VEHICLE CONTROL.
APPLICATION FILED JAN. 13, 1915. RENEWED JAN. 22, 1916.

1,207,732.

Patented Dec. 12, 1916.
2 SHEETS—SHEET 1.

J. B. ENTZ.
MOTOR VEHICLE CONTROL.
APPLICATION FILED JAN. 13, 1915, RENEWED JAN. 22, 1916.

1,207,732.

Patented Dec. 12, 1916.
2 SHEETS—SHEET 2.

*Fig. 3. Charging.*  *Fig. 4. Starting.*  *Fig. 5. Off.*

Witnesses:
M. MacIntyre
A. E. Parham

Inventor
Justus B. Entz
By his Attorneys
Sheffield-Betts

UNITED STATES PATENT OFFICE.

JUSTUS B. ENTZ, OF CLEVELAND, OHIO.

MOTOR-VEHICLE CONTROL.

1,207,732.     Specification of Letters Patent.     Patented Dec. 12, 1916.

Application filed January 13, 1915, Serial No. 1,906.    Renewed January 22, 1916. Serial No. 73,755.

*To all whom it may concern:*

Be it known that I, JUSTUS B. ENTZ, a citizen of the United States, and a resident of the city of Cleveland, county of Cuyahoga, and State of Ohio, have invented certain new and useful Improvements in Motor-Vehicle Control, of which the following is a specification.

My invention is directed to improvements in the control of motor vehicles and has particular reference to motor vehicles which are operated and controlled by systems of electric power transmission and control similar to those disclosed in my Patent No. 732,062, June 30, 1903, and in my application Serial No. 417,309, filed February 24, 1908.

The modern motor car is provided with means, usually mechanical, such as shiftable gears, for controlling the transmission of power from the prime mover to the load. It is also provided with a storage battery which may be used to start the prime mover through the medium of an electric motor, and to furnish current for lighting, etc. It therefore becomes necessary to provide some means such as an electric generator, driven by the prime mover, to charge the storage battery. The provision of these various elements, together with the necessary controlling levers and switching appliances therefor, results in a very complicated and cumbersome apparatus.

By the inventions described in my above referred to patent and application, I have not only improved upon the usual mechanical power-controlling means, by substituting therefor systems of electric power transmission and control which are much more convenient to operate, but I have greatly simplified the entire apparatus by making use of the elements of the transmission systems, in connection with the usual storage battery, for starting the prime mover, charging the battery, etc. These systems of transmission and control include two dynamo electric machines, one having one element connected to a prime mover and the other element to the load; and the other having one element stationary and the other element connected to the load; together with a controller for varying the connections between said machines, to vary the speed and torque factors of the power transmitted to the load. There is also included a storage battery for starting the prime mover through the medium of one of the said machines and means for charging the storage battery, also through the medium of one of the said machines.

One object of my present invention is to improve and simplify the systems above outlined, and especially the means for controlling and operating the same.

Another object of my invention is to provide two dynamo electric machines having such characteristics that they will perform their function of power transmission most efficiently and to provide means for altering these machines so that they will have the entirely different characteristics necessary for efficiently performing other functions such as the charging of the storage battery while the vehicle is in motion, the charging of the storage battery while the vehicle is stationary, the electric braking of the vehicle, and the electric starting of the prime mover.

By my present invention I have greatly simplified the means for controlling the various functions of my improved system, the entire controlling means being reduced to a single drum controller which may be arranged so that its operating lever is located on the steering wheel or at some other convenient place.

It has been found that series dynamo electric machines are most useful and efficient for power transmission and control, and I therefore use machines of this type for this purpose. But series machines are not well adapted to perform certain of the other functions required of the elements of my system. For instance, I have found that the storage battery can ordinarily be maintained in a sufficiently charged condition by providing for its being charged at a comparatively low rate while the vehicle is running with the controller in its highest speed position. But, under such conditions, as will hereinafter appear, the armature speed of the dynamo electric machine which is at this time available for charging purposes, varies widely, and if this machine were of the series type the rate of charging would vary accordingly. I, therefore, temporarily convert this machine into one which will charge the battery at a substantially constant rate, irrespective of the speed of its armature.

Although, as indicated above, the charging of the battery while the vehicle is in motion is sufficient for all ordinary demands of current, emergencies may occur when it is necessary to charge the battery while the vehicle is stationary. In such cases it is important that the charging be at a relatively high rate, and that precautions be taken against the reversal of the battery. It is not, however, necessary to make provision for wide variations in the speed of the charging machine, since it is driven by the prime mover, the speed of which may be maintained substantially constant. Thus it becomes necessary to again convert one of the series machines into a machine having the requisite characteristics for most efficiently meeting the demands made upon it.

One of the dynamo electric machines of my transmission system may advantageously be used as an electric brake, and I have therefore provided means whereby the braking action may be gradually and most efficiently applied, when desired.

In cases of emergency such as engine trouble or lack of fuel, it is often very desirable to have some means of propelling the car without the use of the prime mover. I accomplish this, by providing for the propulsion of the car by the discharge of the storage battery through one of the dynamo electric machines, in a manner which will be more fully described hereinafter.

Other features, objects and advantages of my invention will appear from the following specification and the claims appended thereto.

Figure 1:
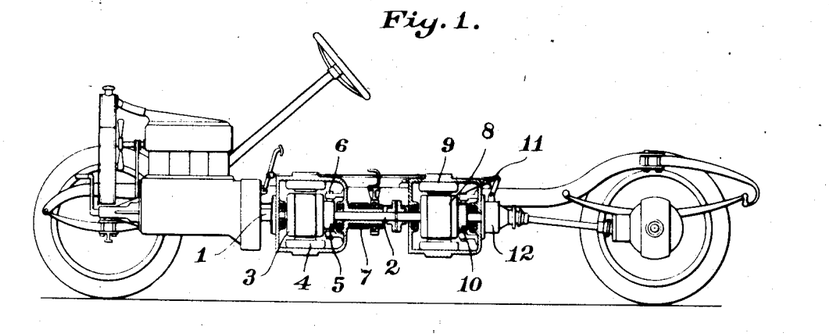
Figure 1 shows, more or less diagrammatically, the general arrangement of the various parts of my transmission as applied to the chassis of a self-propelled vehicle.

In the embodiment of my invention illustrated in the drawing, which is intended merely as an example of one of the many uses to which my invention may be put, 1 designates the driven shaft of any suitable prime mover, such as an internal combustion engine, adapted to drive a load such as the transmission shaft 2 of a self-propelled vehicle. The first of the two dynamo electric machines, i. e., that located nearest the front of the vehicle, and which will hereinafter, for convenience, be termed the "generator," comprises the rotary armature 3, connected to the shaft 2 and moving with it, and the rotary field member 4, secured to the shaft 1. Secured to the armature 3 is the commutator 5, with which the brushes 6, mounted on, and rotating with, the field member, coöperate. Of the four collector rings 7, also mounted on the field member, two are for conducting current to and from the field windings, and the other two are electrically connected to the brushes 6. The second dynamo electric machine, which for convenience will be called the "motor," comprises the rotary armature 8, connected to the shaft 2, and the stationary field member 9. Secured to the armature 8 is the commutator 10, with which the stationary brushes 11 coöperate. I make use of any suitable reversing gear indicated diagrammatically at 12, for reversing the rotation of the driving wheels, although reversal may be secured electrically.

Figure 2:
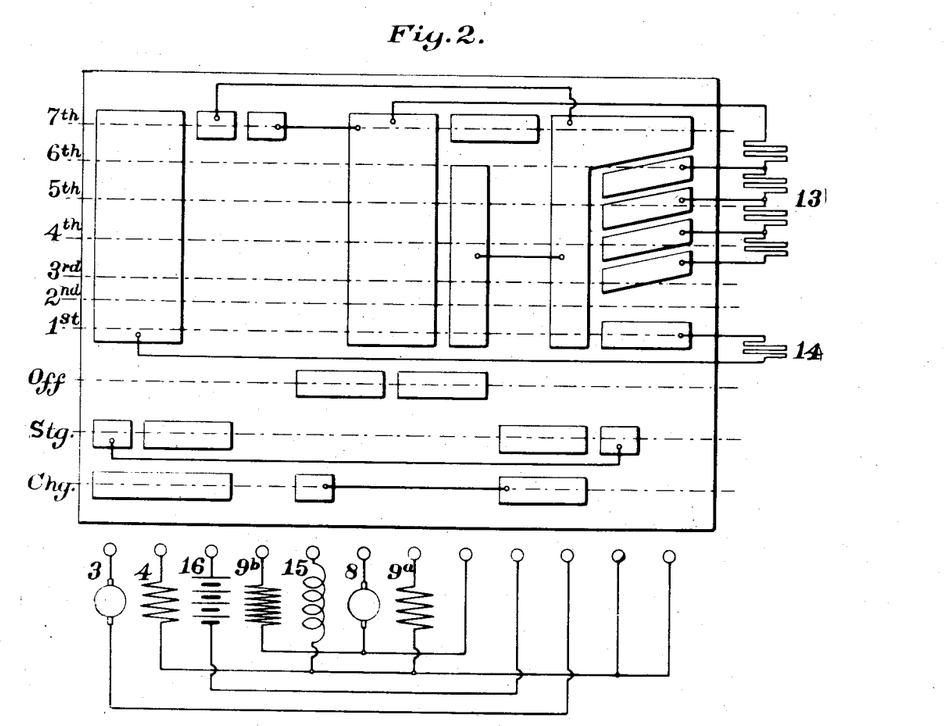
Fig. 2 illustrates, diagrammatically, a development of the controller.

In addition to the electrical elements above referred to, I make use of the variable resistance 13, the constant resistances 14 and 15, and the storage battery 16, all of which are shown diagrammatically in Fig. 2. The windings of field 9 of the motor consist of a series winding $9^a$, and a shunt winding $9^b$.

Figure 5:
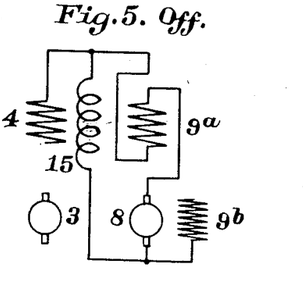

In the off or braking position of the controller, as may be seen by reference to Fig. 5, the motor, with its series field $9^a$ reversed with respect to its direction in the running position, is short circuited through a resistance 15 which may be inductive or non-inductive. With the parts so connected, there is no current in any of the circuits when the car is stationary, but at speeds of the car in excess of 10 to 15 miles an hour a current is generated by the motor which results in an electric braking action which effectively retards the speed of the car. If the resistance 15 is inductive, the braking effort is more evenly and gradually applied, due to the counter-electromotive force of self-induction set up by the initial variation in the current passing through the resistance. As the current continues to pass through the resistance it gradually assumes a constant value and as a result the counter-electromotive force gradually decreases, thus permitting the gradual application of braking effort. In the drawing, I have shown the generator in open circuit, but, obviously, it may be rendered ineffective in any other suitable manner, such as by having its field short circuited upon itself.

In Figs. 6 to 11, inclusive, I have shown the connections corresponding to the first six speed positions of the controller. In each of these positions it will be noted that the motor and generator are connected in series, the series winding of the motor field being utilized and the shunt winding open circuited. With the parts so connected, the current produced in the generator by the relative movement of its members is passed through the motor and a corresponding torque is produced in the motor to be added to the torque of the prime mover. Furthermore, by varying the field strength of the motor, the speed and torque applied to the load may be varied, since a decrease of field strength of the motor decreases its counter-electro-motive force with the result that less slip is required between the elements of the generator to balance such a counter-electro-motive force, and the speed applied to the load is correspondingly increased. This increase in speed is accompanied by a corresponding decrease in torque. On the other hand, if the motor field is strengthened its counter-electro-motive force and torque are increased and the speed of the load is consequently decreased.

Figure 6:
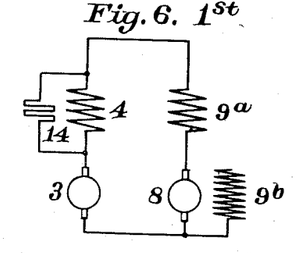

In Fig. 6, I have shown the connections for starting the vehicle from rest or, in other words, the connections corresponding to the first speed position of the controller. These connections comprise the necessary connections for placing the two dynamo-electric machines in series and include also the placing of a resistance 14, in shunt with the series field 4 of the generator. This resistance is preferably non-inductive and as a result, upon the movement of the controller to this position, the greater proportion of the first rush of current from the generator will pass through the non-inductive shunt, rather than through the inductive field winding. In other words, the shunt serves to divert the excessive starting current from the field of the generator and thus prevents the sudden application of a heavy load to the prime mover. As the current from the generator gradually reaches a constant value, the proportion of the current passing through the shunt 14 gradually decreases, with the result that the load on the prime mover is gradually brought to its maximum value.

Figure 7:
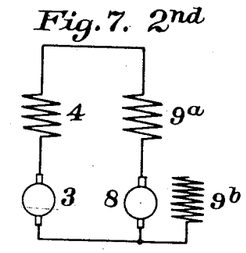

In Fig. 7, which illustrates the second running position of the controller, resistance 14 is eliminated, the motor and generator being connected in series with one another. This increases the speed of the load due to the greater electromotive force of the generator resulting from its greater field strength.

Figure 8:
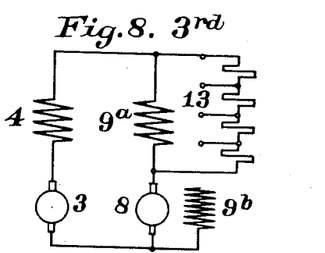

In Fig. 8, which illustrates the connections corresponding to the third speed position of the controller, I have shown a variable resistance 13, in shunt with the series field winding 9ª of the motor. The effect of placing this variable resistance in shunt with the motor field is to reduce the field strength and hence the torque produced by the motor, and to increase the speed of the load.

Figure 9:
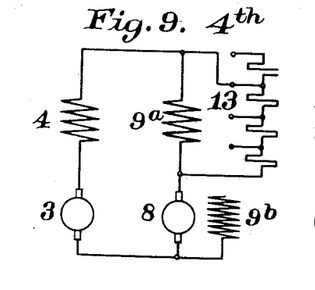
Figure 10:
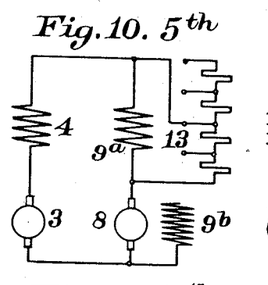
Figure 11:
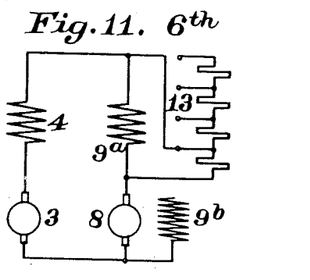

Figs. 9, 10 and 11 illustrate the connections corresponding to the fourth, fifth and sixth speed positions of the controller, respectively, and are identical with the connections shown in Fig. 8, except that the variable resistance 13 is progressively reduced from a maximum in Fig. 8 to a minimum in Fig. 11. As is evident, this effects a progressive decrease in the field strength of the motor and consequently a progressive increase in speed and decrease in torque applied to the load.

Figure 12:
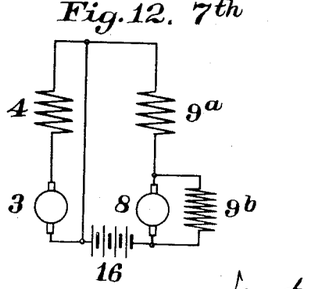

Fig. 12 illustrates the connection corresponding to the seventh speed position of the controller. In this position I provide for the short circuiting of the generator upon itself to act as a magnetic clutch, there being just sufficient slip between the field and armature thereof to generate sufficient voltage to overcome the resistance of the generator circuit. Thus the speed and torque applied to the load are substantially the same as the speed and torque of the prime mover. In this position I also eliminate the resistance 13, leaving the field winding 9ª connected in series with the motor armature, and I connect the field winding 9ᵇ in shunt with this armature and in opposition to the series field winding 9ª. Thus I have converted the motor into a differential generator which I connect in series with the storage battery 16, and which operates to charge the battery at a substantially constant rate, irrespective of speed of the armature. Obviously, the speed of the armature 8 varies with the speed of the car, and as the speed of the car is commonly varied within wide limits, with the controller in this position, this converting of the series machine into a self-regulating generator is of great importance. This same position of the controller may be utilized for the electrical propulsion of the vehicle, which, as above indicated, is very convenient in times of emergency. If the controller is moved to this position when the prime mover is stationary, or nearly so, the battery will discharge through the motor and propel the car forward for a considerable distance.

Figure 4:
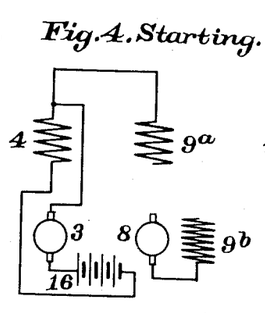

In Fig. 4 I have shown the connections for starting the prime mover, such as an internal combustion engine, which connections correspond with the starting position of the controller. To effect this, I connect the storage battery in series with the generator armature 3, and the reversed generator field 4, so that the generator acts as a motor to turn the engine over in the proper direction. The relation of the current in the field and armature, in this position, must be opposite to that of the running position, as otherwise the engine would be turned backward. It also results, from this reversal of armature and field connection, that when the engine starts and its speed increases it cannot act as a generator and thus tend to drive the car, as it is still acting as a series motor from which the current diminishes with increase of speed, but which cannot reverse its direction. These connections may also be utilized for propelling the vehicle backward by the battery, if the brake is released, and the prime mover is maintained stationary.

Figure 3:
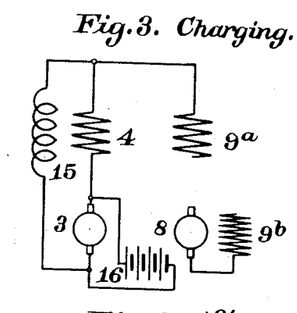
Figs. 3 to 12, inclusive, show diagrammatically the different electrical connections corresponding to different positions of the controller.

In Fig. 3 are shown the connections for charging the storage battery at a comparatively high rate when the vehicle is at rest, corresponding to the charging position of the controller. In this position I connect the generator field 4, and the resistance 15 in series therewith, across the terminals of the armature 3, and I also connect the storage battery 16 across said terminals for the purpose of charging the battery. Since the field 4 is thus, in effect, connected across the terminals of the battery 16, the current in the field 4 will necessarily be of the proper amount and direction to cause the armature 3 to generate voltage in the proper direction before charging the battery. Thus I have converted the series machine into a shunt generator, with weakened field, which charges the battery at the proper rate and prevents reversal of the same. When the car is stationary the generator is directly driven by the prime mover, and therefore it is not necessary to make provision for variations in its speed.

The method of operation of my invention should be clear from the above. When the vehicle and its prime mover are stationary, the first step necessary is to start the prime mover. This is done by moving the controller backward to starting position, which, as shown in Fig. 4, results in driving the generator as a motor from the storage battery. The armature 3 being held stationary, the field 4 which is connected to the prime mover rotates and starts the prime mover. As soon as the prime mover starts to operate, the controller is returned to the off position shown in Fig. 5. To start the vehicle in motion, the controller is advanced to the first speed position, and then as its speed picks up the controller is progressively advanced to the seventh speed position, shown in Fig. 12, in which position, as above described, the motor acts as a generator to charge the battery. It is understood, of course, that the speed of the prime mover, and therefore the speed of the vehicle, may be varied within wide limits at each setting of the controller.

If, for any reason, it is found necessary to charge the battery with the vehicle at rest, the prime mover is first started, as above. But, then, instead of returning the controller to off position, it is moved backward still another step to the charging position. In this position, as shown in Fig. 3, the generator acts to charge the battery.

I have not illustrated the specific mechanical construction of the controller used by me in making the various connections above described, since this forms no part of my invention, it being the subject-matter of a separate application, filed by Robert W. Stanley, October 7, 1914, Serial No. 865,425.

I do not wish to limit myself to the specific arrangement of parts and circuit connections shown herein, since changes which do not depart from the spirit of my invention and which are within the scope of the appended claims will be obvious to those skilled in the art.

What I claim is:

1. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect said machines in series to actuate the load; and to short circuit the first machine on itself to act as a magnetic clutch, connect a series field and an opposing shunt field to the armature of the second machine and connect said second machine to a battery to charge the same.

2. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect said machines in series to actuate the load and with a non-inductive resistance shunted around the field of the first machine to divert the excessive starting current; to cut out said resistance; and to short circuit the first machine on itself to act as a magnetic clutch, connect a series field and an opposing shunt field to the armature of the second machine and connect said second machine to a battery to charge the same.

3. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect said machines in series to actuate the load; to progressively decrease the field strength of the second machine to vary the speed of the load; and to short circuit the first machine on itself to act as a magnetic clutch, connect a series field and an opposing shunt field to the armature of the second machine and connect said second machine to a battery to charge the same.

4. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect said machines in series to actuate the load and with a non-inductive resistance shunted around the field of the first machine to divert the excessive starting current; to cut out said resistance; to progressively decrease the field strength of the second machine to vary the speed of the load; and to short circuit the first machine on itself to act as a magnetic clutch, connect a series field and an opposing shunt field to the armature of the second machine and connect said second machine to a battery to charge the same.

5. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine, and a resistance in series therewith, in shunt with its armature and connect said first machine to a storage battery to charge the same, the second machine being ineffective; and to connect said machines in series to actuate the load.

6. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine, and a resistance in series therewith, in shunt with its armature and connect said first machine to a storage battery to charge the same, the second machine being ineffective; to connect said machines in series to actuate the load; and to progressively decrease the field strength of the second machine to vary the speed of the load.

7. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine, and a resistance in series therewith, in shunt with its armature and connect said first machine to a storage battery to charge the same, the second machine being ineffective; to connect said machines in series to actuate the load and with a non-inductive resistance shunted around the field of the first machine to divert the excessive starting current; and to cut out said resistance.

8. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine, and a resistance in series therewith, in shunt with its armature and connect said first machine to a storage battery to charge the same, the second machine being ineffective; to connect said machines in series to actuate the load and with a non-inductive resistance shunted around the field of the first machine to divert the excessive starting current; to cut out said resistance; and to progressively decrease the field strength of the second machine to vary the speed of the load.

9. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine, and a resistance in series therewith, in shunt with its armature and connect said first machine to a storage battery to charge the same, the second machine being ineffective; to connect said machines in series to actuate the load; and to short circuit the first machine on itself to act as a magnetic clutch, connect a series field and an opposing shunt field to the armature of the second machine and connect said second machine to the battery to charge the same.

10. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine, and a resistance in series therewith, in shunt with its armature and connect said first machine to a storage battery to charge the same, the second machine being ineffective; to connect said machines in series to actuate the load and with a non-inductive resistance shunted around the field of the first machine to divert the excessive starting current; to cut out said resistance; and to short circuit the first machine on itself to act as a magnetic clutch, connect a series field and an opposing shunt field to the armature of the second machine and connect said second machine to the battery to charge the same.

11. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine, and a resistance in series therewith, in shunt with its armature and connect said first machine to a storage battery to charge the same, the second machine being ineffective; to connect said machines in series to actuate the load; to progressively decrease the field strength of the second machine to vary the speed of the load; and to short circuit the first machine on itself to act as a magnetic clutch, connect a series field and an opposing shunt field to the armature of the second machine and connect said second machine to the battery to charge the same.

12. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine, and a resistance in series therewith, in shunt with its armature and connect said first machine to a storage battery to charge the same, the second machine being ineffective; to connect said machines in series to actuate the load and with a non-inductive resistance shunted around the field of the first machine to divert the excessive starting current; to cut out said resistance; to progressively decrease the field strength of the second machine to vary the speed of the load; and to short circuit the first machine on itself to act as a magnetic clutch, connect a series field and an opposing shunt field to the armature of the second machine and connect said second machine to the battery to charge the same.

13. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; to connect said machines in series with fields unreversed to actuate the load; and to short circuit the first machine on itself to act as a magnetic clutch, connect a series field and an opposing shunt field to the armature of the second machine and connect said second machine to the battery to charge the same.

14. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; to connect said machines in series with fields unreversed to actuate the load and with a non-inductive resistance shunted around the field of the first machine to divert the excessive starting current; to cut out said resistance; and to short circuit the first machine on itself to act as a magnetic clutch, connect a series field and an opposing shunt field to the armature of the second machine and connect said second machine to the battery to charge the same.

15. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; to connect said machines in series with fields unreversed to actuate the load; to progressively decrease the field strength of the second machine to vary the speed of the load; and to short circuit the first machine on itself to act as a magnetic clutch, connect a series field and an opposing shunt field to the armature of the second machine and connect said second machine to the battery to charge the same.

16. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; to connect said machines in series with fields unreversed to actuate the load and with a non-inductive resistance shunted around the field of the first machine to divert the excessive starting current; to cut out said resistance; to progressively decrease the field strength of the second machine to vary the speed of the load; and to short circuit the first machine on itself to act as a magnetic clutch, connect a series field and an opposing shunt field to the armature of the second machine and connect said second machine to the battery to charge the same.

17. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load; and to short circuit the first machine on itself to act as a magnetic clutch, connect a series field and an opposing shunt field to the armature of the second machine and connect said second machine to the battery to charge the same.

18. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load and with a non-inductive resistance shunted around the field of the first machine to divert the excessive starting current; to cut out said resistance; to short circuit the first machine on itself to act as a magnetic clutch, connect a series field and an opposing shunt field to the armature of the second machine and connect said second machine to the battery to charge the same.

19. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load; to progressively decrease the field strength of the second machine to vary the speed of the load; and to short circuit the first machine on itself to act as a magnetic clutch, connect a series field and an opposing shunt field to the armature of the second machine and connect said second machine to the battery to charge the same.

20. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load and with a non-inductive resistance shunted around the field of the first machine to divert the excessive starting current; to cut out said resistance; to progressively decrease the field strength of the second machine to vary the speed of the load; and to short circuit the first machine on itself to act as a magnetic clutch, connect a series field and an opposing shunt field to the armature of the second machine and connnect said second machine to the battery to charge the same.

21. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect said machines in series with fields unreversed to actuate the load; and to short circuit the first machine on itself to act as a magnetic clutch, connect a series field and an opposing shunt field to the armature of the second machine and connect said second machine to a battery to charge the same.

22. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect said machines in series with fields unreversed to actuate the load and with a non-inductive resistance shunted around the field of the first machine to divert the excessive starting current; to cut out said resistance; and to short circuit the first machine on itself to act as a magnetic clutch, connect a series field and an opposing shunt field to the armature of the second machine and connect said second machine to a battery to charge the same.

23. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect said machines in series with fields unreversed to actuate the load; to progressively decrease the field strength of the second machine to vary the speed of the load; and to short circuit the first machine on itself to act as a magnetic clutch, connect a series field and an opposing shunt field to the armature of the second machine and connect said second machine to a battery to charge the same.

24. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect said machines in series with fields unreversed to actuate the load and with a non-inductive resistance shunted around the field of the first machine to divert the excessive starting current; to cut out said resistance; to progressively decrease the field strength of the second machine to vary the speed of the load; and to short circuit the first machine on itself to act as a magnetic clutch, connect a series field and an opposing shunt field to the armature of the second machine and connect said second machine to a battery to charge the same.

25. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect the first machine with field reversed to a storage battery to start the prime mover, the second machine being ineffective; to connect said machines in series with fields unreversed to actuate the load; and to short circuit the first machine on itself to act as a magnetic clutch, connect a series field and an opposing shunt field to the armature of the second machine and connect said second machine to the battery to charge the same.

26. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect the field of the first machine, and a resistance in series therewith, in shunt with its armature and connect said first machine to a storage battery to charge the same, the second machine being ineffective; to connect said machines in series with fields unreversed to actuate the load; and to short circuit the first machine on itself to act as a magnetic clutch, connect a series field and an opposing shunt field to the armature of the second machine and connect said second machine to the battery to charge the same.

27. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load; and to short circuit the first machine on itself to act as a magnetic clutch, connect a series field and an opposing shunt field to the armature of the second machine and connect said second machine to the battery to charge the same.

28. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load and with a non-inductive resistance shunted around the field of the first machine to divert the excessive starting current; to cut out said resistance; and to short circuit the first machine on itelf to act as a magnetic clutch, connect a series field and an opposing shunt field to the armature of the second machine and connect said second machine to the battery to charge the same.

29. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; and to connect said machines in series with fields unreversed to actuate the load; to progressively decrease the field strength of the second machine to vary the speed of the load; and to short circuit the first machine on itself to act as a magnetic clutch, connect a series field and an opposing shunt field to the armature of the second machine and connect said second machine to the battery to charge the same.

30. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load and with a non-inductive resistance shunted around the field of the first machine to divert the excessive starting current; to cut out said resistance; to progressively decrease the field strength of the second machine to vary the speed of the load; and to short circuit the first machine on itself to act as a magnetic clutch, connect a series field and an opposing shunt field to the armature of the second machine and connect the said second machine to a battery to charge the same.

31. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine, and a resistance in series therewith, in shunt with its armature and connect said first machine to a storage battery to charge the same, the second machine being ineffective; to connect said machines in series to actuate the load; and to short circuit the first machine on itself to act as a magnetic clutch.

32. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine, and a resistance in series therewith, in shunt with its armature and connect said first machine to a storage battery to charge the same, the second machine being ineffective; to connect said machines in series to actuate the load and with a non-inductive resistance shunted around the field of the first machine to divert the excessive starting current; to cut out said resistance; and to short circuit the first machine on itself to act as a magnetic clutch.

33. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine, and a resistance in series therewith, in shunt with its armature and connect said first machine to a storage battery to charge the same, the second machine being ineffective; to connect said machines in series to actuate the load; to progressively decrease the field strength of the second machine to vary the speed of the load; and to short circuit the first machine on itself to act as a magnetic clutch.

34. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine, and a resistance in series therewith, in shunt with its armature and connect said first machine to a storage battery to charge the same, the second machine being ineffective; to connect said machines in series to actuate the load and with a non-inductive resistance shunted around the field of the first machine to divert the excessive starting current; to cut out said resistance; to progressively decrease the field strength of the second machine to vary the speed of the load; and to short circuit the first machine on itself to act as a magnetic clutch.

35. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load; and to short circuit the first machine on itself to act as a magnetic clutch.

36. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load and with a non-inductive resistance shunted around the field of the first machine to divert the excessive starting current; to cut out said resistance; and to short circuit the first machine on itself to act as a magnetic clutch.

37. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load; to progressively decrease the field strength of the second machine to vary the speed of the load; and to short circuit the first machine on itself to act as a magnetic clutch.

38. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load and with a non-inductive resistance shunted around the field of the first machine to divert the excessive starting current; to cut out said resistance; to progressively decrease the field strength of the second machine to vary the speed of the load; and to short circuit the first machine on itself to act as a magnetic clutch.

39. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect the field of the first machine, and a resistance in series therewith, in shunt with its armature and connect said first machine to a storage battery to charge the same, the second machine being ineffective; to connect said machines in series with fields unreversed to actuate the load; and to short circuit the first machine on itself to act as a magnetic clutch.

40. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load; and to short circuit the first machine on itself to act as a magnetic clutch.

41. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short-circuit the second machine with field reversed through a resistance to act as an electric brake, the first machine being ineffective; to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load and with a non-inductive resistance shunted around the field of the first machine to divert the excessive starting current; to cut out said resistance; and to short circuit the first machine on itself to act as a magnetic clutch.

42. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load; to progressively decrease the field strength of the second machine to vary the speed of the load; and to short circuit the first machine on itself to act as a magnetic clutch.

43. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; to connect the first machine with field reversed to a storage battery to start the prime mover, the second machine being ineffective; to connect the field of the first machine, and a resistance in series therewith, in shunt with its armature and connect said first machine to the storage battery to charge the same, the second machine being ineffective; to connect said machines in series with fields unreversed to actuate the load and with a non-inductive resistance shunted around the field of the first machine to divert the excessive starting current; to cut out said resistance; to progressively decrease the field strength of the second machine to vary the speed of the load; and to short circuit the first machine on itself to act as a magnetic clutch.

44. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect a series field and an opposing shunt field to the armature of the second machine and connect said second machine to a battery to charge the same.

45. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the first machine on itself to act as a magnetic clutch, and at the same time connect the second machine to a storage battery to charge the same.

46. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the first machine on itself to act as a magnetic clutch, and at the same time connect a series field and an opposing shunt field to the armature of the second machine and connect said second machine to a storage battery to charge the same.

47. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect said machines in series to actuate the load; and to short circuit the first machine on itself to act as a magnetic clutch and connect the second machine to a storage battery to charge the same.

48. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine and a resistance in series therewith in shunt with its armature and connect said first machine to a storage battery to charge the same and to short circuit the first machine on itself to act as a magnetic clutch and connect the second machine to a storage battery to charge the same.

49. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the field of the first machine in shunt with its armature and connect said first machine to a storage battery to charge the same; and to short circuit the first machine on itself to act as a magnetic clutch and connect a series field and an opposing shunt field to the armature of the second machine and connect said second machine to a storage battery to charge the same.

50. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective, and to short circuit the first machine on itself to act as a magnetic clutch, and connect the second machine to a storage battery to charge the same.

51. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the first machine with field reversed to a storage battery to start the prime mover, the second machine being ineffective; and to short circuit the first machine on itself to act as a magnetic clutch, connect a series field and an opposing shunt field to the armature of the second machine, and connect said second machine to the battery to charge the same.

52. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as a magnetic brake; and to short circuit the first machine on itself to act as a magnetic clutch, and connect the second machine to a storage battery to charge the same.

53. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short circuit the second machine with field reversed through a resistance to act as an electric brake, the first machine being ineffective; and to short circuit the first machine on itself to act as a magnetic clutch, connect a series field and an opposing shunt field to the armature of the second machine, and connect said second machine to a battery to charge the same.

JUSTUS B. ENTZ.

Witnesses:
WALTER S. JONES,
A. M. WALL.